(12) United States Patent
Horng

(10) Patent No.: US 7,128,557 B2
(45) Date of Patent: Oct. 31, 2006

(54) STRUCTURE OF ICE CREAM SCOOP

(76) Inventor: Ruey-Lan Horng, No. 420, Lane 942, Da-Wan Road, Yung-Kang City, Tainan Hsien (TW)

( * ) Notice: Subject to any disclaimer, the term of this patent is extended or adjusted under 35 U.S.C. 154(b) by 46 days.

(21) Appl. No.: 10/986,094

(22) Filed: Nov. 12, 2004

(65) Prior Publication Data

US 2006/0105074 A1   May 18, 2006

(51) Int. Cl.
*A29G 9/28* (2006.01)

(52) U.S. Cl. ...................................... 425/286; 425/444
(58) Field of Classification Search ................ 425/221, 425/276–286, 444; D7/681; 30/324
See application file for complete search history.

(56) References Cited

U.S. PATENT DOCUMENTS

| | | | | |
|---|---|---|---|---|
| 2,682,705 A | * | 7/1954 | Johnson | 30/324 |
| 4,161,381 A | * | 7/1979 | Sciortino | 425/286 |
| 4,392,806 A | * | 7/1983 | Houle | 425/286 |
| 4,699,582 A | * | 10/1987 | Chen | 425/187 |
| 4,721,449 A | * | 1/1988 | Alberts | 425/187 |

* cited by examiner

*Primary Examiner*—Donald Heckenberg
(74) *Attorney, Agent, or Firm*—Rosenberg, Klein & Lee

(57) ABSTRACT

An improved structure of an ice cream scoop is disclosed. The ice cream scoop comprises a first part and a second part that integrate with one another. The improvement of the ice cream scoop comprises a neck portion in a bended shape for providing an auxiliary elastic force and enhancing the structural strength of the neck portion.

1 Claim, 5 Drawing Sheets

STRUCTURE OF ICE CREAM SCOOP

FIELD OF THE INVENTION

The present invention relates to an improved structure of an ice cream scoop, and more particularly to an ice cream scoop that comprises a tongue piece for pushing out the ice cream.

BACKGROUND OF THE INVENTION

In the summer time, ice cream is one of favorite sweet foods of many people. The ice cream is basically composed of milk, butter, sugar, and other heavy additives. The ice cream is different from the general ice in that the ice cream provides with dense and luxuriant form and taste. In order to cater to various dietetic cultures or habits of eating ice cream, there are formed various ice cream scoops for ladling the ice cream in the form of a ball or a round mass. However, in view of the above description, the ice cream adheres to the ice cream scoop easily due to its dense and luxuriant properties. Therefore, many improved structures are provided to readily and quickly push out the ladled ice cream from the scoop after it is ladled.

Referring to FIG. 1, a conventional ice cream scoop 1 comprises a scoop part 11 and a handle part 12. The scoop part 11 comprises a push piece 13 mounted on an inner side thereof. The push piece 13 is connected to a press component 14 such that when a force is applied to the press component 14 the push piece 13 is raised from the inner side of the scoop part 11. Besides, an elastic device 15 abuts the press component 14 such that when the press component 14 is pressed the elastic property of the elastic device 15 enables the press component 14 and the push piece 13 to reset to their initial positions.

The drawbacks of the conventional ice cream scoop are that the elastic device 15 is an integral element since the push piece 13 and the press component 14 are connected with one another. Thus, it complicates the structure. Moreover, the elastic device 15 is separated from the push piece 13 and the press component 14. Therefore, the elastic device 15 is helpless for the structural strength of the push piece 13 and the press component 14.

Besides, the related references are listed as follows:
1. Taiwan patent publication No. 094,636, entitled "IMPROVED STRUCTURE OF PRESS TYPE ICE CREAM SCOOP".
2. Taiwan patent publication No. 080,712, entitled "ICE CREAM SCOOP".
3. U.S. Pat. No. 4,699,582.
4. U.S. Pat. No. 4,392,806.
5. U.S. Pat. No. 4,161,381.

SUMMARY OF THE INVENTION

In view of the aforementioned drawbacks of the conventional structure, the main purpose of the present invention is to provide an improved structure of an ice cream scoop that comprises a bended neck portion. Therefore, when the press component is pressed, an auxiliary force from the neck portion and an elastic force from the composition material of the second part are both provided for moving up the tongue piece. Therefore, the ice cream is pushed out more readily.

Another purpose of the present invention is to enhance the structural strength of the neck portion by providing with a bended neck portion.

According to the aforementioned purposes of the present invention, an improved structure of an ice cream scoop is provided. The ice cream scoop comprises: a first part, which is in a long and narrow shape, the first part comprising a scoop portion and a main portion arranged in sequence from top to bottom, a through hole being formed on an upper position of the main portion; and a second part, which is in a long and narrow shape, the second part comprising a tongue piece and a main portion arranged in sequence from top to bottom, wherein the tongue piece is in a curved shape conforming to an inner surface of the scoop portion of the first part, and the improvement comprises: a neck portion in a bended shape, the neck portion being mounted on the second part in a position between the tongue piece and the main portion of the second part for providing an auxiliary elastic force and enhancing the structural strength of the neck portion.

The other features and preferred embodiments of the present invention will now be described with reference to the accompanying drawings.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
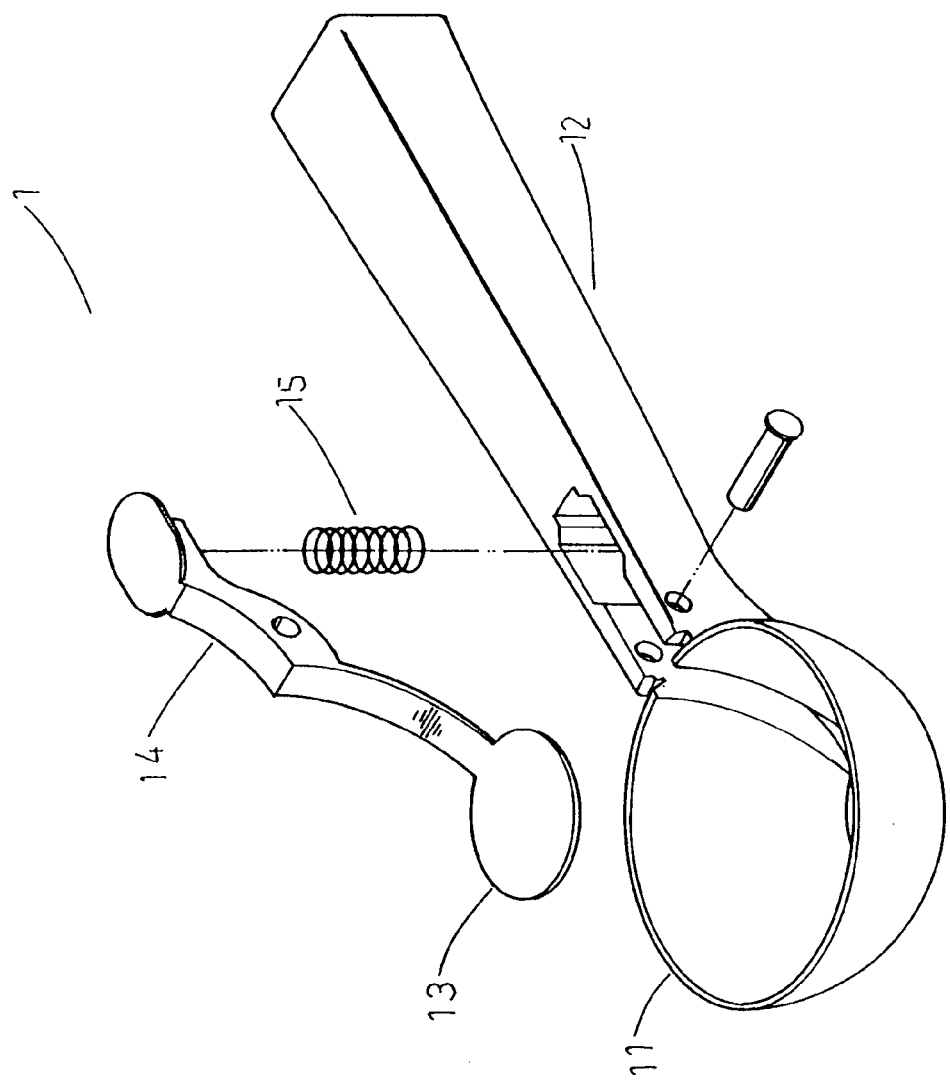
FIG. 1 is an exploded perspective view showing a conventional ice cream scoop.
Figure 2:
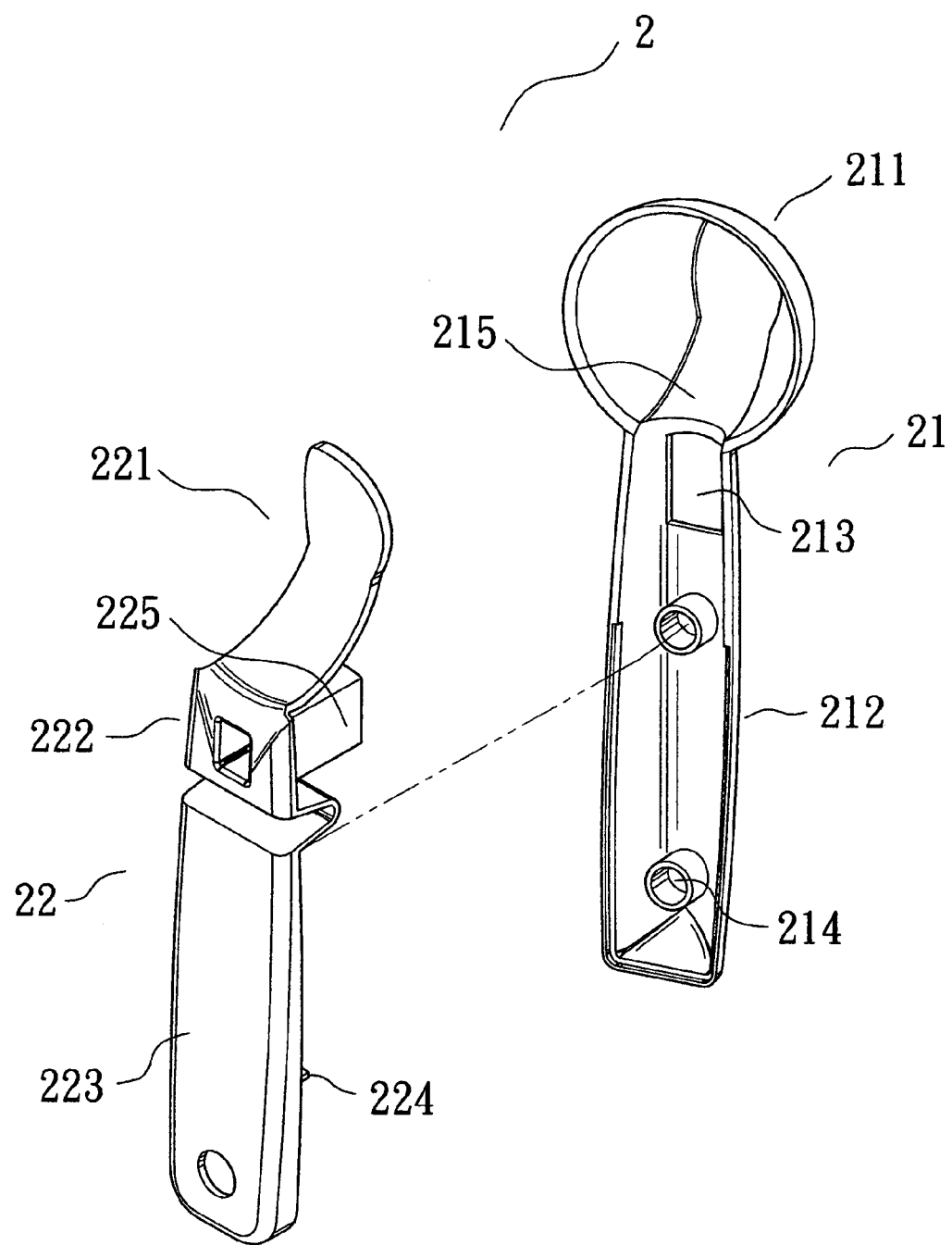
FIG. 2 is an exploded perspective view showing an ice cream scoop of the present invention.
Figure 3:
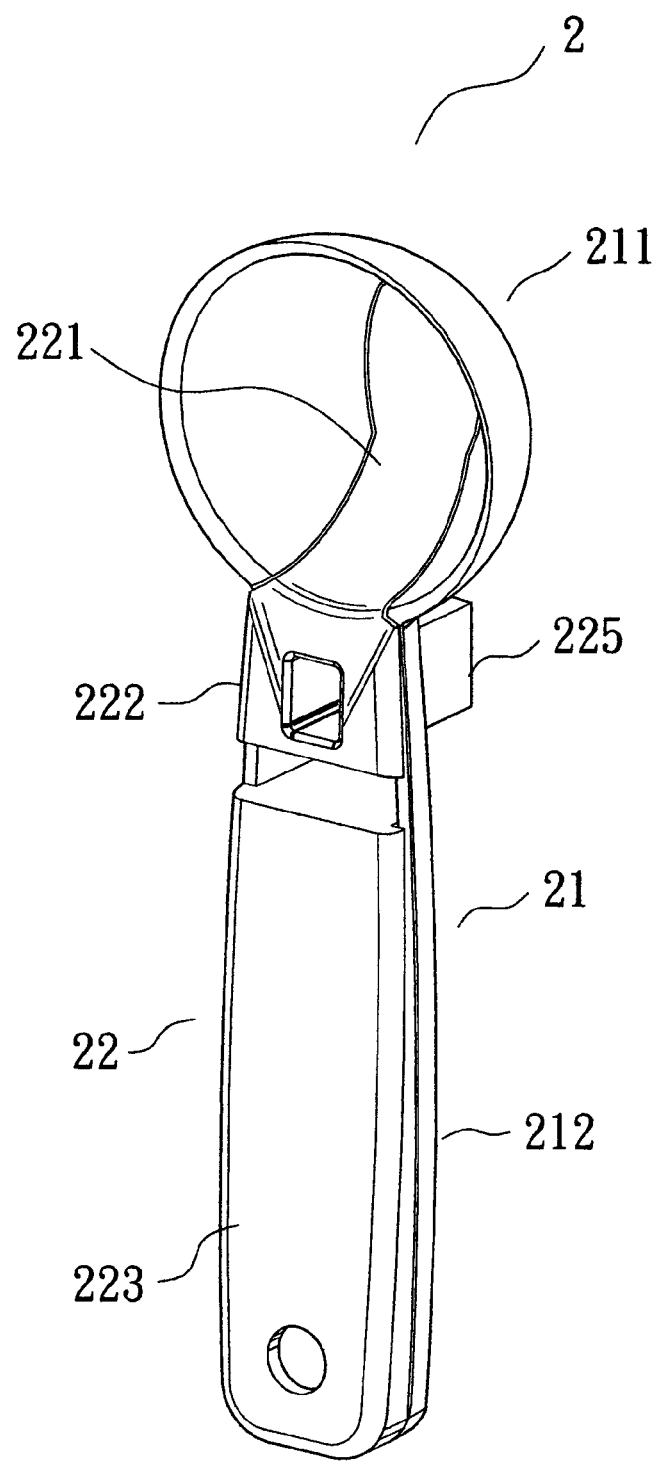
FIG. 3 is a perspective view showing the assembly of the ice cream scoop of the present invention.
Figure 4:
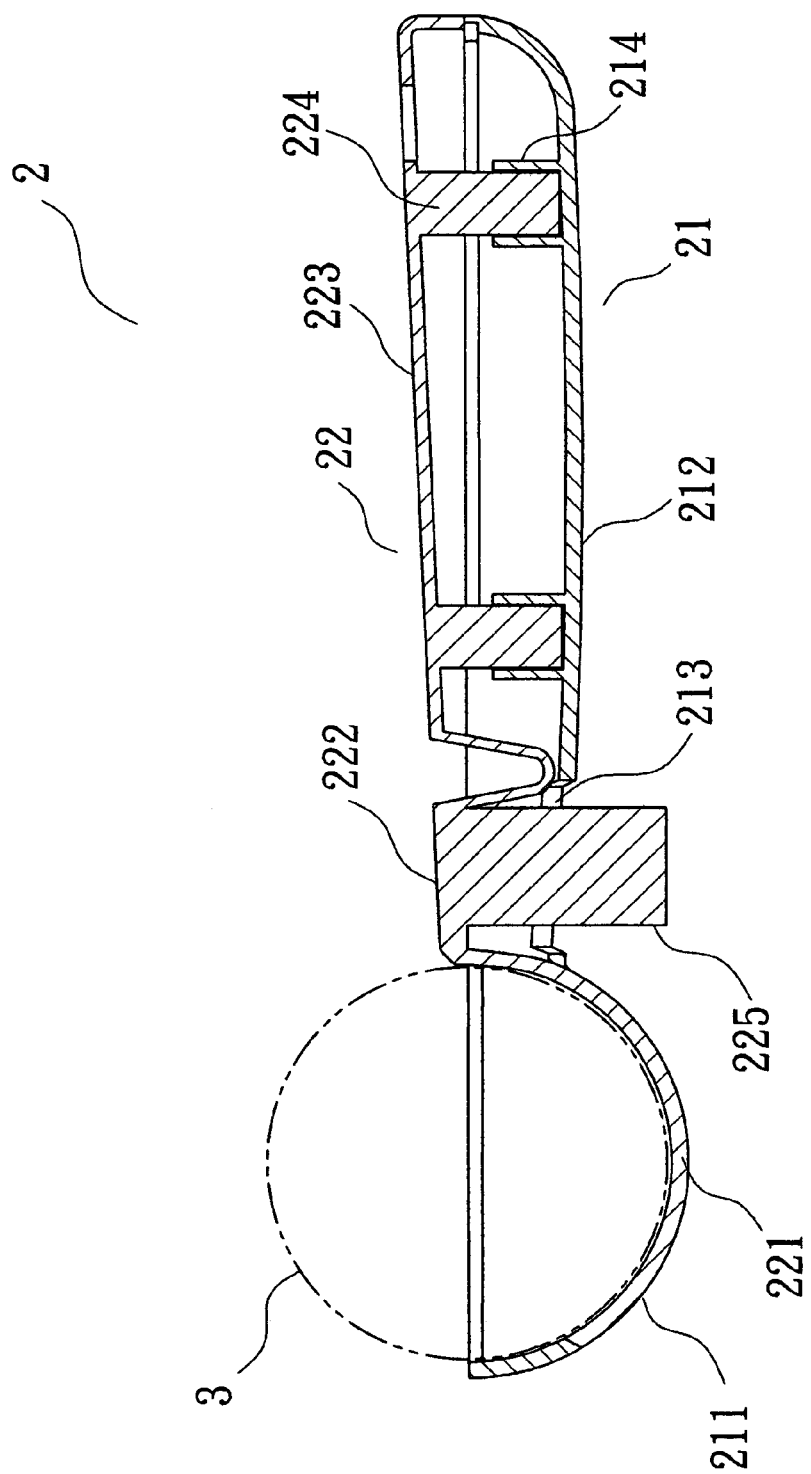
FIG. 4 is a sectional view showing the assembly of the ice cream scoop of the present invention.

Referring to FIG. 2 through FIG. 4, the invention relates to an improved structure of an ice cream scoop. The ice cream scoop 2 substantially comprises a first part 21 and a second part 22.

The first part 21, which is in a long and narrow shape, comprises a scoop portion 211 and a main portion 212 arranged in sequence from top to bottom. A through hole 213 is formed on an upper position of the main portion 212. At least one first connection device 214 is mounted on an inner side of the first part 21 for integrating with at least one corresponding second connection device 224 of the second part 22. Moreover, a shallow trench 215, which is in a curved shape conforming to a tongue piece 221, is formed on an inner surface of the scoop portion 211.

The second part 22, which is in a long and narrow shape, comprises the tongue piece 221, a neck portion 222, and a main portion 223 arranged in sequence from top to bottom, wherein the tongue piece 221 is in a curved shape conforming to the shallow trench 215 on the inner surface of the scoop portion 211, thereby the surface of the tongue piece 211 and the inner surface of the scoop portion 211 commonly constitute a flatness surface. Besides, a press component 225 is mounted on the neck portion 222, wherein the press component 225 is also mounted on an inner side of the second part 22 in a position corresponding to the through hole 213 that forms on the main portion 212 of the first part 21. The press component 225 extends beyond the through hole 213 when the first part 21 and the second part 22 are coupled with one another. Moreover, the neck portion 222 is in a bended shape. The second connection device 224 is mounted on the inner side of the second part 22 so as to couple with the corresponding first connection device 214 that mounts on the first part 21.

Figure 5:
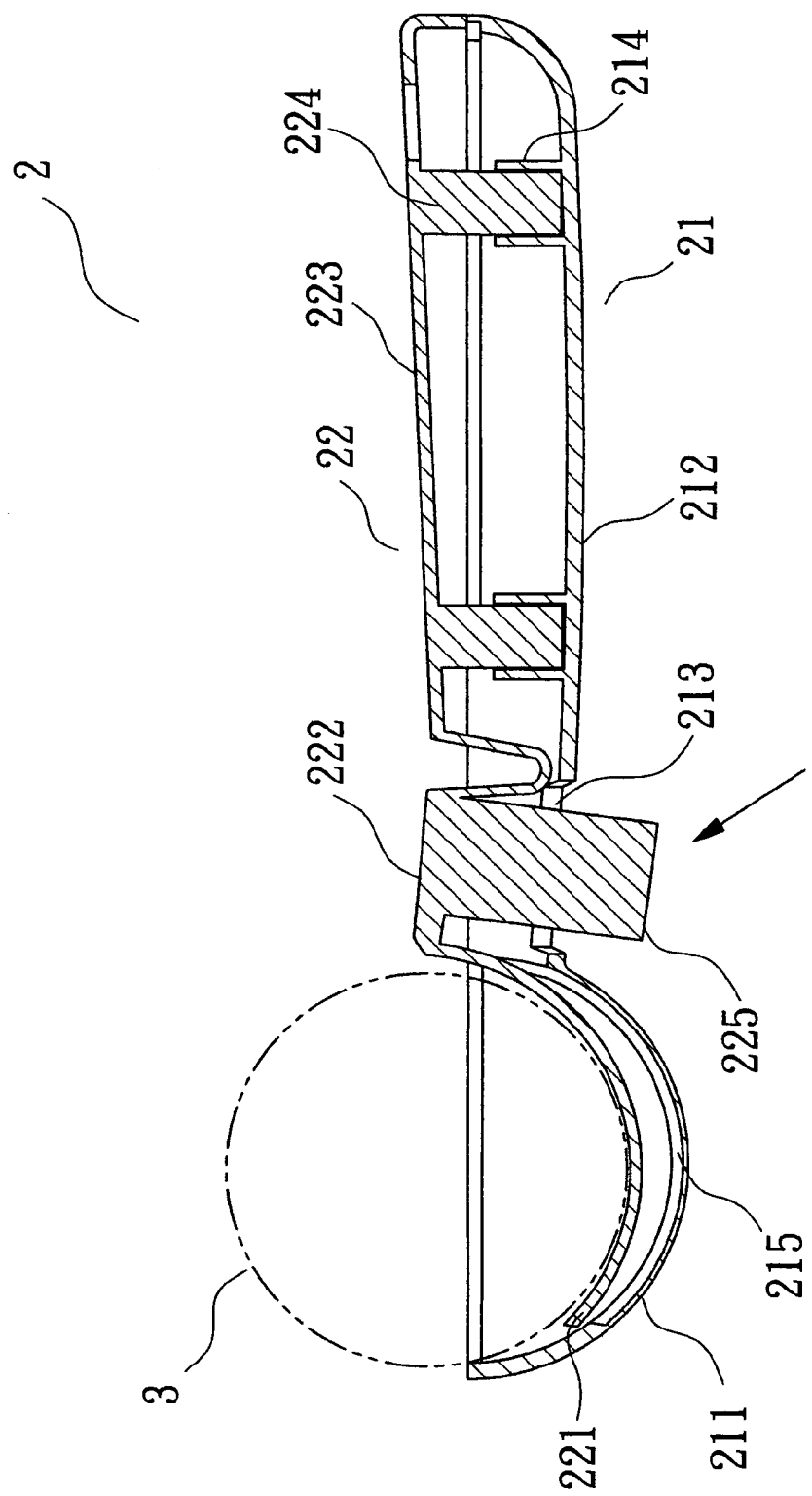
FIG. 5 is a sectional view showing a motion diagram of the ice cream scoop of the present invention.

Referring to FIG. 5, which shows a motion diagram of the present invention. The press component 225 is pressed by a force applied from the rear side of the through hole 213 formed on the main portion 212 of the first part 21 along a direction of an arrow shown in this figure. Since the tongue piece 221 is connected with the press component 225, the tongue piece 221 is moved up easily for pushing out the ice cream 3 from the scoop portion 211.

It is worthy to note that the neck portion 222 of the second part 22 of the present invention is in a bended shape. Therefore, when the press component 225 is pressed, an auxiliary force from the neck portion 222 and an elastic force from the composition material of the second part 22 are both utilized. Consequently, the ice cream 3 is pushed out from the scoop portion 211 more readily. Alternatively, the present invention may not comprise the press component so the user may insert his finger into the through hole for directly moving the neck portion. Besides, the structural strength of the neck portion 222 is enhanced since it is in a bended shape.

As described above, the present invention that satisfies requirements for patentability, i.e. utility, novelty, and non-obviousness is submitted.

However, the above description merely illustrates the preferred embodiments of the present invention, and the applicable scope of the present invention is not limited hereto. Any obvious modification and revision made by a person skilled in the art are included within the spirit and scope of the present invention.

What is claimed is:

1. An improved structure of an ice cream scoop comprising:

an elongated first part including a scoop portion integrally attached in single piece formation with a main portion, a through hole being formed on the main portion adjacent to said scoop portion; and an elongated second part including a tongue piece and a main portion, the tongue piece having a curved shape conforming to an inner surface of the scoop portion of the first part, the second part further including a neck portion in a bended shape and a press component attached to the neck portion, the neck portion, the press component, the tongue piece and the main portion of the second part being integrally attached one to another in single piece formation so that the press component and the tongue piece are biased by an elastic force provided by the neck portion.

* * * * *